United States Patent Office 3,652,734
Patented Mar. 28, 1972

3,652,734
DYEABLE POLYOLEFIN COMPOSITION
Milton Farber, Verona, and Ronald W. Fuest, Kinnelon, N.J., assignors to Uniroyal, Inc., New York, N.Y.
No Drawing. Filed May 1, 1970, Ser. No. 33,987
Int. Cl. C08f 29/12
U.S. Cl. 260—897 B       20 Claims

ABSTRACT OF THE DISCLOSURE

A dyeable fiber-forming composition comprising a major amount of polyolefin blended with a minor amount of a high molecular weight ethylene oxide containing polymer and a styrene-acrylonitrile copolymer.

BACKGROUND OF THE INVENTION

Field of the invention

The present invention relates to a polymer blend which can be formed into fibers and which comprises a polyolefin, between about 0.5 and 3% polyethylene oxide and between about 3% and 10% of a copolymer of styrene and acrylonitrile. The articles shaped from said blends are dyeable with disperse dyes.

Description of the prior art

The use of styrene-acrylonitrile copolymers by themselves as dye receptor sites for polyolefin fibers is disclosed in U.S. Pat. 3,299,185. The disclosure does not include the use of high molecular weight polyethylene oxide which is essential to the present invention.

The use of polyethylene oxide in combination with basic polymer dye receptors (i.e., polymers which bind anionic dyestuffs, e.g. amine-containing polymer) is disclosed in U.S. Pat. 3,530,201, but poly(styrene-co-acrylonitrile) is not regarded as a basic polymer in the usual Bronsted theory sense of the word nor in its specific use property in the present invention since it does not bind anionic dyes.

Polyethylene oxide and related compounds have been used as additives in fibers, including its use as dye receptor, in such references as U.S. Pats. 3,329,577, 3,337,652, 3,375,213 and Japanese Pat. 40–9,742, but the combination with poly(styrene-co-acrylonitrile) and the resultant synergism has not been disclosed.

SUMMARY OF THE INVENTION

Polyolefins are well known for being inherently undyeable due both to lack of polar sites in their molecular structures to which dye molecules may become attached, and to difficulty of penetration of dye molecules into their molecular structures. Processes for overcoming these defects have long been sought, because good dyeability is a prerequisite for many commercial applications to which these polymers would be outstandingly suited. For example, blends of polyolefins with minor amounts of various modifiers have been used, but said modifiers have been incompatible, unstable, expensive and/or their affinity for dyestuffs hase been weak.

The prior art also suggests the use of combinations of modifiers to impart dyeability to polyolefins.

However, these disclosures are of such a vague and general nature that they provide no guide whatsoever for the actual preparation of commercially acceptable dyeable fibers.

Other techniques for making polyolefins dyeable have involved the use of relatively large, that is, greater than five to ten percent by weight, amounts of additive dye receptors. These techniques are impractical because of the incompatibility of such amounts of dye receptor additives with the polyolefins which incompatibility results in poor spinnability, weak fiber properties, and because of the great added expense of the dye receptor.

The present invention represents a method for achieving dyeability which is both practical and economical.

Styrene-acrylonitrile (SAN) copolymer represents a very good dye receptor for polyolefin fibers, since it is inexpensive, thermally stable and compatible with polyolefins. In corporation of SAN by itself into polyolefins gives the resultant fibers some affinity for disperse dyes, but this affinity is not great enough to yield dyeings of practical commercial utility. Increasing the amount of SAN in the matrix up to about 6% and greater still does not give the desired dyeability, and the fiber starts to become discolored at this level of SAN present. This discoloration is due to the known thermal decomposition of the acrylonitrile moiety in polymers containing this monomer.

Polyethylene oxide alone as a dye receptor, yields little or no dyeability in polyolefin fiber at levels up to about 3%. Since its compatibility with the above-noted polymers is somewhat limited, and the use of larger quantities requires higher extrusion temperatures, the use of higher levels of polyethylene oxide is not desirable.

The addition of small amounts of polyethylene oxide, however, in the order of about 0.5 to 3%, to the SAN in the polyolefin brings about an unexpected improvement in dye affinity, to the point where a fiber of commercially useful dyeability can be produced. In addition, the amount of SAN can be kept below 6% so that excessive discoloration is avoided. Since this fiber is dyeable with disperse dyes only, it can be dyed not only by itself to a single color, but in combination with polyolefin or polyester fibers containing basic polymer dye receptors which are dyeable with anionic dyes. In this way, two-color dyeings can be realized from a single dye bath which contains disperse and anionic dyes.

In the present invention, the shaped articles, fabrics or fibers made from polyolefins comprise a major portion of inherently undyeable polyolefins comprising both homopolymers and copolymers of alphamonoolefins; for example, copolymers with non-terminal olefins or with one or more other alpha-olefins, as well as block copolymers of alpha-olefins with each other and graft copolymers of alpha-olefins with polymers of other alpha-olefins. The class includes polyethylene, polypropylene, poly (3-methyl-1-butene), poly (4-methyl-1-pentene), copolymers of propylene and 4-methyl-1-pentene, and copolymers of any of the foregoing monomers with each other and/or with other copolymerizable monomers. The preferred material of this class is propylene and any copolymer containing predominately polymerized propylene together with any other comonomer copolymerized therewith.

The olefin matrix polymer described above should be present in an amount of not less than 87% based upon the total weight of the composition.

The composition of the SAN copolymer, present in amounts ranging from 3 to 10%, can be varied considerably, so long as the material is utilizable in the invention in regard to stability, compatibility and the like.

The SAN copolymer which may be used in accordance with the present invention is prepared by copolymerizing a nitrile monomer having the formula:

(I)

wherein Z represents hydrogen or methyl; and an alkenyl aromatic monomer having the formula:

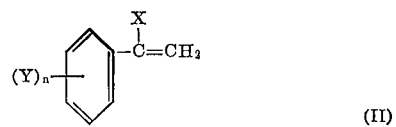
(II)

wherein X represents hydrogen or a lower alkyl radical having 1 to 5 carbon atoms; Y represents a member of the group consisting of hydrogen, chlorine, bromine or lower alkyl radicals containing from 1 to 4 carbon atoms such as the methyl, ethyl, propyl, isopropyl, butyl, sec-butyl and tert-butyl radicals; and $n$ represents an integer from 1 to 5.

The relative proportions of styrene and acrylonitrile moieties can be varied as desired, except that lowering the acrylonitrile content lowers dyeability and raising it increases the tendency for discoloration during extrusion. A content of 10 to 40%, acrylonitrile is the general range, preferably 25 to 35% at molecular weights between 50,000 and 1,000,000.

Preferred styrene monomers used are unsubstituted styrene, alpha-methylstyrene and nuclear substituted styrenes such as p-methylstyrene, p-tertbutyl styrene. Preferred nitriles are acrylonitrile and alpha-methacrylonitrile.

The polyethylene oxide component is a hydrophilic compound which is a homopolymer or derivative thereof, or copolymer, all of which specifically contain ethylene oxide units [—$CH_2$—$CH_2$—O—]. It has a molecular weight from 100,000 to 7,000,000. The preferred range is 200,000 to 3,000,000 but this is not critical. The materials should contain at least 70% ethylene oxide by weight.

It has been determined by color intensity measurements that a commercially acceptable dyed fiber can be obtained if the polyethylene oxide component of the composition is:

(1) Polyethylene oxide (also referred to herein as PEO), or (2) Copolymers containing a minimum of 70% by weight ethylene oxide, for example the series of block or irregular copolymers produced by condensing ethylene oxide with a product formed by the condensation of propylene oxide with propylene glycol (formula of such copolymers: HO—$(C_2H_4O)_x(C_3H_6O)_y(C_2H_4O)_z$H) and sold under the trademark "Pluronic." Other useful copolymers are derived from the polymerization of ethylene oxide and propylene oxide, or (3) Derivatives of polyethylene oxide such as ethers and esters of same having an ethylene oxide content of at least 70% by weight. Examples of such derivatives are: (a) polyethylene oxide alkyl ethers; (b) alkylaryl polyethoxy-alcohols sold under the trademark "Triton" (the octyl-(or isoctyl-) phenyl polyethoxyethanol series); (c) polyoxyethylene derivatives of long chain fatty acid, partial esters of hexitol anhydrides including sorbitans, sorbides, mannitans and mannides, such as polyethylene oxide hexitol carboxylates preferably polyoxyethylene sorbitan monolaurate sold under the trademark "Tween 20" and polyoxyethylene sorbitan monostearate; and (d) polyethylene oxide carboxylate esters such as polyethylene oxide monostearate and polyethylene oxide distearate.

To summarize, the overall makeup of the novel composition of the present invention may be represented as a blend of three components:

(A) at least 87% (by weight) of a polyolefin;
(B) between about 3 and 10% preferably between 4 and 6% (by weight) of a styrene- acrylonitrile (SAN) copolymer, as described above;
(C) between about 0.5 and 3% preferably between 1 and 2% of a high molecular weight polyethylene oxide, as described above;

wherein the minimum total amount of (B) (C) components must be about 4%.

Production of the composition may be accomplished by conventional means, e.g., forming, molding, extrusion, fiber spinning (melt or solution), etc. The individual constituents may be mixed by the most convenient conventional methods, in any order desired. The preferred technique for producing the composition in the form of fiber is as follows:

(1) Dry blend the polyethylene oxide and SAN by tumbling, rotating, etc. in commercially available equipment.
(2) Dry blend this mixture with the polyolefin in a similar fashion.
(3) Pelletize the resultant blend by melt extrusion through holes of about ⅛″ diameter at about 500° F., followed by chopping the resultant strands into pellets.
(4) Melt spin the pellets into fiber, using conventional fiber extrusion equipment, at temperatures between 500° and 550° F.
(5) Subsequently drawing, texturizing or otherwise processing the resultant yarn.

The fibers of the present invention are highly dyeable with disperse dyes. The dyeing process is carried out in the usual manner. i.e., in an aqueous medium, at a pH usually between 3 and 8, and at temperatures up to the boiling point of water. The fastness of the dyed product to light, laundering and dry cleaning is very good. Since this fiber is dyeable only with disperse dyes, combinations of it with other fibers capable of being dyed with other classes of dyes can be made, which will yield novel multicolor effects. Such other fibers, for instance, are described in U.S. Pat. 3,361,843 and U.S. Pat. 3,530,201. Optionally, a minor (i.e., up to about 5%) amount of basic nitrogen containing polymers such as those described in U.S. 3,361,843 (the contents of which are hereby incorporated by reference herein) may be used in combination with the SAN polymers as the B component. In this way the shaped article can be made dyeable with anionic dyes.

The appended examples demonstrate not only the high dyeability of the fibers in the present invention, but also the interaction between the SAN and the polyethylene oxide. Polyethylene oxide by itself in polyolefin yields little or no dyeability with disperse dyes, even at levels up to 3%. The SAN by itself in polyolefin imparts only moderate dyeability, which is of no commercial utility. The combination of polymers, however, imparts very good dyeability which is commercially useful.

The composition of matter is described herein mainly in terms of fibers (both staple and continuous filament), but it is to be understood that other forms also may be produced such as monofilaments, multifilaments, films, and tapes which can subsequently be processed into fibers.

EXAMPLE 1

A blend of 1% polyethylene oxide (molecular weight 600,000; polyethylene oxide WSR–205, Union Carbide Co.) and 5% styrene-acrylonitrile copolymer (72% styrene, 28% acrylonitrile, intrinsic viscosity 1.0 measured in dimethyl formamide at 30° C.) was tumbled with isotactic polypropylene (intrinsic viscosity=1.9 measured in tetralin at 130° C.), extruded at 500° F. through a die having ⅛″ holes, and the extruded rod chopped into pellets. The pellets were then melt-spun into fiber at 535° using a die with 0.02″ holes. A 52-filament yarn was produced, which after drawing 2.5:1 had a denier of about 22 denier per filament.

Three ends of this yarn were plied and texturized to produce a final yarn of about 4,000 nominal denier. This yarn was then tufted into jute backing to make a carpet, samples of which were dyed as follows:

The samples were first scoured at 180° F. for 20 minutes, using a pH of 9–10 and with a small amount (0.5% on the weight of the fiber—OWF) of a non-ionic surfactant. After rinsing, the scoured samples were dyed in a bath containing 3% OWF of disperse dye (dyes listed below), a small amount of nonionic surfactant, 2% diammonium phosphate OWF, and enough acetic acid to adjust the pH to about 7.0. The bath was maintained at 212° F. for 60 min., after which the samples were rinsed. They were then post-scoured for 20 minutes at 160° F., using 0.5% OWF of nonionic surfactant. The following dyes are used to produce clear deep shades:

| | C.I. No. |
|---|---|
| Disperse Yellow 23 | 26070 |
| Disperse Yellow 42 | 10338 |
| Disperse Orange 3 | 11005 |
| Disperse Red 1 | 11110 |
| Disperse Blue 27 | 60767 |

EXAMPLE 2

Mixtures of polypropylene with the amounts of SAN and polyethylene oxide listed in Table 1 were melt-spun into 8-filament yarn at 550° F. and the yarn drawn 4:1 to a final denier of 120. Skeins of this yarn were dyed for one hour at the boil after a pre-scour as described in Example 1, using 3% OWF of either Latyl Orange 3R (C.I. Disperse Orange 21) or Calcosyn Blue RP (C. I. Disperse Blue 116). The dyeability results are shown in Table I.

TABLE I

| SAN (percent) | Polyethylene oxide (percent)¹ | Color intensity of dyed sample with 3% OWF | |
|---|---|---|---|
| | | Latyl Orange 3R | Calcosyn Blue RP |
| 5 | 4 | Dark | Med.-dark. |
| 4 | 2 | Med.-dark | Do. |
| 4 | 1 | Dark | Dark. |
| 2 | 2 | Med.-dark | Med.-dark. |

¹ Molecular wt. 3×10⁶.

EXAMPLE 3

Mixtures of polypropylene with either SAN or polyethylene oxide were melt-spun into fiber using the procedure described in Example 2 and dyed with Latyl Orange 3R at the boil for one hour. The intensities of the dyeings obtained are listed in Table II.

TABLE II

| SAN (percent) | Polyethylene, molecular wt. | Glycol, percent | Dyed sample color intensity |
|---|---|---|---|
| 0 | 3,000,000 | 3 | Very light. |
| 0 | 600,000 | 3 | Do. |
| 0 | 3,000,000 | 1.5 | Almost colorless. |
| 5 | | 0 | Light. |

EXAMPLE 4

Blends of polypropylene with 5% SAN and 1% of the derivatives or copolymers of polyethylene oxide listed below were melt-spun into fiber according to the procedure of Example 2. These could all be dyed to dark shades with 3% OWF of the dyes listed in Example 1, using the procedure of Example 1. The materials used were:

(a) Polyethylene glycol monomethyl ether molecular weight of polyethylene glycol=5,000

(b) Polyethylene glycol monostearate, molecular weight of polyethylene glycol=4170

(c) Polyethylene glycol monoether of p-isooctylphenol, molecular weight of polyethylene glycol=3080

(d) Ethylene oxide-propylene oxide block copolymer, with 80% (by weight) ethylene oxide content, molecular weight of polyethylene oxide=16,250.

Having thus described our invention, what we claim and desire to protect by Letters Patent is:

1. A fiber-forming composition of matter which is dyeable with disperse dyes comprising:

(A) less than 96.5% but at least 87% of a polyolefin;
(B) between about 3 and 10% of a copolymer, prepared by copolymerizing a nitrile monomer having the general formula:

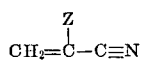

(I)

wherein Z is selected from hydrogen, chlorine or methyl, with an alkenyl aromatic monomer having the general formula:

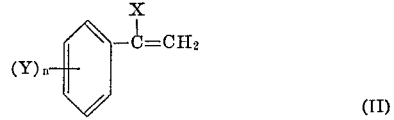

(II)

wherein X represents hydrogen or a lower alkyl radical having 1 to 5 carbon atoms; Y represents a member of the group consisting of hydrogen, chlorine, bromine, lower alkyl radicals containing from 1 to 4 carbon atoms, and $n$ represents an integer from 1 to 5, said polymer containing between about 10 and 40% of said nitrile moiety and having a molecular weight between 50,000 and 1,000,000 and (C) between about 0.5% and 3% of an ethylene oxide-containing polymer having a molecular weight in the range of from 100,000 to 7,000,000 and selected from the group consisting of:

(a) homopolymers of ethylene oxide,
(b) ether and ester derivatives thereof;
(c) copolymers of ethylene oxide and an alkylene oxide other than ethylene oxide; all of which ethylene oxide containing polymers possess a degree of polymerization not less than 4, and an ethylene oxide content not less than 70%, and wherein the total amount of said (B) plus (C) component is greater than 4%, all percentages being expressed as parts by weight.

2. The composition of claim 1 wherein the polyolefin is selected from polyethylene, polypropylene, poly (3-methyl-1-butene) or poly (4-methyl-1-pentene).

3. The composition of claim 1 in which the (B) component polymer is formed from said nitrile monomers (I) wherein Z is hydrogen, and said alkenyl aromatic monomer (II) wherein X is hydrogen, Y is hydrogen and $n$ is 1.

4. The composition of claim 1 in which the (B) component polymer is formed from said nitrile monomer (I) wherein Z is hydrogen and said alkenyl aromatic monomer wherein X is methyl, Y is hydrogen and $n$ is 1.

5. The composition of claim 1 in which the (B) component polymer is formed from said nitrile monomer (I) wherein Z is methyl and said alkenyl aromatic monomer wherein X is hydrogen, Y is hydrogen and $n$ is 1.

6. The composition of claim 1 in which the (B) component polymer is formed from said nitrile monomer (I) wherein Z is methyl and said alkenyl aromatic monomer wherein X is methyl, Y is hydrogen and $n$ is 1.

7. The composition of claim 1 wherein said copolymer contains between 25 and 35% of said nitrile moiety.

8. The composition of claim 3 wherein A is polypropylene and C is polyethylene oxide.

9. The composition of claim 4 wherein A is polypropylene and C is polyethylene oxide.

10. The composition of claim 5 wherein A is polypropylene and C is polyethylene oxide.

11. The composition of claim 6 wherein A is polypropylene and C is polyethylene oxide.

12. The composition of claim 7 wherein the polyolefin is selected from polyethylene, polypropylene, poly (3-methyl-1-butene) or poly (4-methyl-1-pentene).

13. The composition of claim 7 in which the (B) component polymer is formed from said nitrile monomers (I) wherein Z is hydrogen, and said alkenyl aromatic monomer (II) wherein X is hydrogen, Y is hydrogen and $n$ is 1.

14. The composition of claim 7 in which the (B) component polymer is formed from said nirtile monomer (I) wherein Z is hydrogen and said alkenyl aromatic monomer wherein X is methyl, Y is hydrogen and $n$ is 1.

15. The composition of claim 7 in which the (B) component polymer is formed from said nitrile monomer (I)

wherein Z is methyl and said alkenyl aromatic monomer wherein X is hydrogen, Y is hydrogen and $n$ is 1.

16. The composition of claim 7 in which the (B) component polymer is formed from said nitrile monomer (I) wherein X is methyl and said alkenyl aromatic monomer wherein X is methyl, Y is hydrogen and $n$ is 1.

17. The composition of claim 13 wherein A is polypropylene and C is polyethylene oxide.

18. The composition of claim 14 where A is polypropylene and C is polyethylene oxide.

19. The composition of claim 15 wherein A is polypropylene and C is polyethylene oxide.

20. The composition of claim 16 wherein A is polypropylene and C is polyethylene oxide.

References Cited
UNITED STATES PATENTS

| | | | |
|---|---|---|---|
| 3,530,201 | 9/1970 | Schwarcz | 260—857 |
| 3,299,185 | 1/1967 | Kyoto et al. | 260—897 |

MURRAY TILLMAN, Primary Examiner

C. SECCURO, Assistant Examiner

U.S. Cl. X.R.

8—180; 260—896, 897 R; 264—78